United States Patent
Chen et al.

(10) Patent No.: US 12,203,176 B2
(45) Date of Patent: Jan. 21, 2025

(54) CORROSION INHIBITOR FOR SYSTEMS WITH MIXED METALLURGY

(71) Applicant: ECOLAB USA INC., St. Paul, MN (US)

(72) Inventors: Bingzhi Chen, Naperville, IL (US); Zhangzhang Yin, Aurora, IL (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 16/939,897

(22) Filed: Jul. 27, 2020

(65) Prior Publication Data

US 2021/0040622 A1    Feb. 11, 2021

Related U.S. Application Data

(60) Provisional application No. 62/883,749, filed on Aug. 7, 2019.

(51) Int. Cl.
| | | |
|---|---|---|
| *C23F 11/167* | (2006.01) | |
| *C23F 11/14* | (2006.01) | |
| *C23F 11/18* | (2006.01) | |

(52) U.S. Cl.
CPC ........ *C23F 11/1676* (2013.01); *C23F 11/149* (2013.01); *C23F 11/185* (2013.01)

(58) Field of Classification Search
CPC ........... C23F 11/00; C23F 11/06; C23F 11/08; C23F 11/10; C23F 11/14; C23F 11/145; C23F 11/147; C23F 11/148; C23F 11/149; C23F 11/167; C23F 11/1676; C23F 11/173; C23F 11/18; C23F 11/185; C09K 5/10; C09K 5/20; C02F 5/08; C02F 5/10; C02F 5/105; C02F 5/12; C02F 5/125;
(Continued)

(56) References Cited

U.S. PATENT DOCUMENTS

| | | | | |
|---|---|---|---|---|
| 5,018,577 A | * | 5/1991 | Pardue | ........................ C02F 5/14 166/279 |
| 6,572,789 B1 | * | 6/2003 | Yang | ........................ C23F 11/167 252/389.23 |
| 6,685,840 B2 | | 2/2004 | Hatch | |

(Continued)

FOREIGN PATENT DOCUMENTS

| | | |
|---|---|---|
| CN | 101260524 A | 9/2008 |
| CN | 102345130 A | 2/2012 |

(Continued)

OTHER PUBLICATIONS

United States Environmental Protection Agency, 2018 Edition of the Drinking Water Standards and Health Advisories Tables, EPA 822-F-18-001 (Year: 2018).*

(Continued)

*Primary Examiner* — Matthew R Diaz
(74) *Attorney, Agent, or Firm* — Eric D. Babych; Barnes & Thornburg LLP

(57) ABSTRACT

A method of inhibiting corrosion of a metal surface in contact with an aqueous medium is provided. The method may include contacting the metal surface with a corrosion inhibitor composition where the corrosion inhibitor composition may include a phosphino succinic oligomer (PSO); an azole; and a molybdate. The disclosed corrosion inhibitor composition is especially useful for inhibiting corrosion in mixed metallurgy systems.

13 Claims, 4 Drawing Sheets

(58) Field of Classification Search
CPC ...... C02F 5/14; C02F 5/145; C02F 2103/023; C02F 2303/08

See application file for complete search history.

(56) References Cited

U.S. PATENT DOCUMENTS

| | | | |
|---|---|---|---|
| 7,632,458 B2 | 12/2009 | Crovetto et al. | |
| 8,025,840 B2 | 9/2011 | Crovetto et al. | |
| 8,216,383 B2 | 7/2012 | Yang et al. | |
| 8,617,415 B2* | 12/2013 | Yang | C23F 11/10 252/73 |
| 9,023,779 B2 | 5/2015 | Miralles | |
| 9,133,046 B2* | 9/2015 | Blokker | C02F 5/12 |
| 9,290,849 B2 | 3/2016 | Richardson et al. | |
| 9,598,664 B2 | 3/2017 | Yang et al. | |
| 9,771,336 B2* | 9/2017 | Seetharaman | C23F 11/149 |
| 10,174,429 B2 | 1/2019 | Kalakodimi et al. | |
| 10,214,459 B2 | 2/2019 | Kalakodimi et al. | |
| 2008/0169243 A1* | 7/2008 | Dave | C02F 5/12 210/699 |
| 2014/0261567 A1* | 9/2014 | Miralles | C11D 3/378 510/218 |
| 2016/0145442 A1 | 5/2016 | Kalakodimi et al. | |
| 2016/0257868 A1 | 9/2016 | Yang et al. | |
| 2016/0348252 A1* | 12/2016 | Rane | C23F 11/149 |
| 2018/0291250 A1 | 10/2018 | Yang et al. | |
| 2019/0062267 A1 | 2/2019 | Dhawan et al. | |
| 2019/0177616 A1* | 6/2019 | Harbindu | C23F 11/10 |
| 2019/0225855 A1* | 7/2019 | Yang | C23F 11/187 |

FOREIGN PATENT DOCUMENTS

| | | | |
|---|---|---|---|
| CN | 102351325 B | 12/2012 | |
| CN | 103319011 A | 9/2013 | |
| CN | 109319950 A | 2/2019 | |
| CN | 109987724 A | 7/2019 | |
| EP | 0245557 A2 | 11/1987 | |
| EP | 3138889 A1 | 3/2017 | |
| WO | WO-02079105 A1 * | 10/2002 | ............ C23F 11/173 |
| WO | WO-2018013630 A1 * | 1/2018 | ............ C23F 11/187 |

OTHER PUBLICATIONS

International Search Report and Written Opinion, International Application No. PCT/US2020/043724, Dated Nov. 9, 2020, 12 pgs.

Mowbray, et al., Total Approach to Treating Closed Loops Containing Aluminum Boilers, Process Heating Magazine Article, Feb. 12, 2014, 3 pgs.

Case study of an improved passivation of an open recirculating cooling system after turn around by means of the cathodic corrosion inhibitor PSO (phosphino succinic oligomer) in high stress conditions, EUROCORR 2017—The Annual Congress of the European Federation of Corrosion, 20th International Corrosion Congress and Process Safety Congress 2017, Conference: Joint European Corrosion Congress 2017, Sep. 3, 2017-Sep. 7, 2017; Sponsor: Cebelcor; CEZ Group; Leica Microsystems; npj Materials Degradation; Sandvik; Publisher: Asociace.

* cited by examiner

CORROSION INHIBITOR FOR SYSTEMS WITH MIXED METALLURGY

BACKGROUND

1. Field of the Invention

The present disclosure generally relates to corrosion inhibitor compositions. More particularly, the disclosure pertains to corrosion inhibitor compositions containing synergistic blends of phosphino succinic oligomer; an azole; and a molybdate.

2. Description of the Related Art

There is a fundamental shift in how buildings make and deliver hot water for comfortable heating. The market is moving rapidly from the large hot water boiler to modular units with aluminum heating elements. Modular units are easy to install, inexpensive and can reduce utility costs by up to 80%.

Although steel is still widely used in the boiler industry, the use of aluminum or an aluminum alloy in boiler manufacturing is increasing because of more desirable thermal properties such as thermal conductivity and diffusivity. Aluminum and aluminum alloys are stable in ambient conditions, but are prone to corrosion in aqueous conditions, especially at elevated temperatures and in the presence of chlorine ions. Aluminum heating elements are not compatible with conventional high pH corrosion inhibition programs.

Boiler manufacturers generally specify that the boilers operate in the pH range of 7.0-8.5. However, other components in the loop such as heat exchangers and pipes made of mild steel or copper-based metals prefer a different pH operation window to minimize corrosion. For example, hot water closed-loop steel boilers best operate in the range of 8.5-11.0. A lower pH may favor reduced aluminum corrosion, but at a cost of increased carbon steel corrosion, and vice versa for higher pH. An effective water treatment should account for the corrosion of all metals in the system and provide a balanced pH and adequate protection for mixed metallurgy.

The boiler and pipe system may contain other metals such as mild steel, galvanized steel, and copper/brass. Corrosion protection of all the metals and scale control is needed. Metal surfaces in the boiler and/or pipe system are exposed to several possible forms of corrosion: uniform corrosion (due to the very acidic pH of the condensates), pitting corrosion, and/or crevice corrosion.

BRIEF SUMMARY

A method of inhibiting corrosion of a metal surface in contact with an aqueous medium is provided. The method may include contacting the metal surface with a corrosion inhibitor composition where the corrosion inhibitor composition may include a phosphino succinic oligomer (PSO); an azole; and a molybdate.

A corrosion inhibitor composition is provided. The composition may include a PSO; an azole; and a molybdate.

In some aspects, the corrosion inhibitor composition may include a scale inhibitor selected from the group consisting of: a polyacrylate, a polymaleic anhydride, an alkyl epoxy carboxylate, a polyacrylamide copolymer, an acrylic acid and hydroxypropylacrylate copolymer, an acrylic acid and 2-acrylamido-2-methyl propane sulfonate copolymer, a maleic anhydride and sulfonated styrene copolymer, an acrylic acid/acrylamide/tertiary butyl acrylamide copolymer, an acrylic acid/2-acrylamido-2-methyl propane sulfonate/tertiary butyl acrylamide, an acrylic acid/sulfonated styrene/2-acrylamido-2-methyl propane sulfonate, an acrylic acid/acrylamide/aminomethyl sulfonate copolymer, and any combination thereof.

In some aspects, the azole may be tolytriazole (TT), benzotriazole (BZT), mercaptobenzothiazole (MBT), butyl benzotriazole (BBT), halogen resistant azole (HRA), or any combination thereof.

In some aspects, the azole may be TT.

In some aspects, the corrosion inhibitor composition may include a buffering agent or pH modifier selected from the group consisting of: a primary, secondary or tertiary amine, an alkali metal hydroxide, triethanolamine (TEA), morpholine, ethanolamine, sodium hydroxide, potassium hydroxide, and any combination thereof.

In some aspects, the molybdate may be sodium molybdate, potassium molybdate, ammonium molybdates, or any other inorganic molybdate salt.

In some aspects, the PSO comprises formula I $$H \left[ \begin{array}{cc} COOH & COOH \\ | & | \\ C - C \\ | & | \\ H & H \end{array} \right]_n \begin{array}{c} O \\ \| \\ P \\ | \\ OH \end{array} \left[ \begin{array}{cc} COOH & COOH \\ | & | \\ C - C \\ | & | \\ H & H \end{array} \right]_m H$$

wherein n is an integer from 1 to 5 and m is an integer from 0 to 5.

In some aspects, the scale inhibitor may be an acrylic acid and 2-acrylamido-2-methyl propane sulfonate copolymer; the buffering agent is TEA; the azole is tolytriazole or salt thereof; and the molybdate is sodium molybdate dihydrate.

In some aspects, the corrosion inhibitor composition may include water.

In some aspects, the corrosion inhibitor composition consists of water; the PSO; the scale inhibitor; the azole; the buffering agent or pH modifier; and the molybdate.

In some aspects, the corrosion inhibitor composition does not include tin.

In some aspects, the aqueous medium may have a pH of from about 6 to about 9.

In some aspects, the aqueous medium has a chloride concentration of less than about 200 ppm.

In some aspects, the aqueous medium comprises about 10 ppm to about 10,000 ppm of the PSO; about 2 ppm to about 50 ppm of the scale inhibitor; about 0.1 ppm to about 1,000 ppm of the azole; about 0.1 to about 50,000 ppm of the buffering agent or pH modifier; and about 0.1 ppm to about 5,000 ppm of the molybdate.

In some aspects, the method may include adding the corrosion inhibitor composition to the aqueous medium at a dosage rate from about 0.1% by volume to about 2% by volume.

In some aspects, the metal surface comprises a first metal surface comprising aluminum, a second metal surface comprising mild steel, a third metal surface comprising copper, or any combination thereof.

In some aspects, the metal surface may be at least part of an aluminum boiler.

In some aspects, a corrosion rate of the metal surface may be less than about 1 mpy.

In some aspects, a corrosion rate of the metal surface may be less than about 0.5 mpy.

A use of a corrosion inhibitor composition for inhibiting corrosion of a metal surface in contact with an aqueous medium is provided. The corrosion inhibitor composition may include a PSO; an azole; and a molybdate.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE DRAWINGS

A detailed description of the invention is hereafter described with specific reference being made to the drawings in which.

DETAILED DESCRIPTION

Figure 1A:
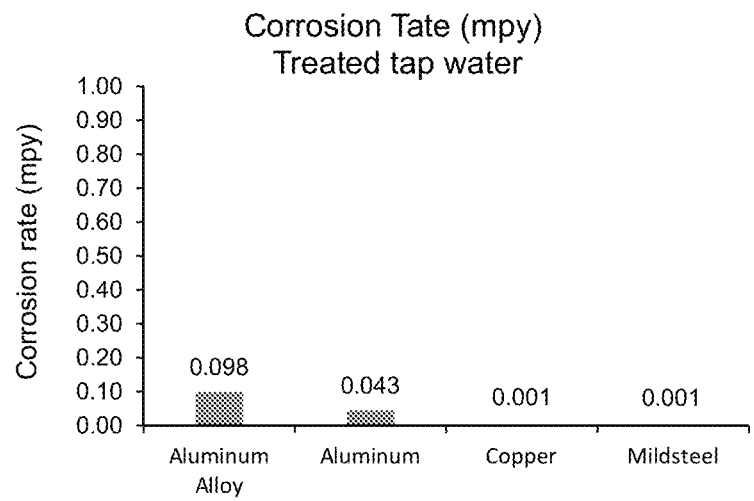
FIGS. 1A and 1B show corrosion rate of metals in tap water treated with example formula and tap water only.

Various embodiments are described below. The relationship and functioning of the various elements of the embodiments may better be understood by reference to the following detailed description. However, embodiments are not limited to those illustrated below. In certain instances details may have been omitted that are not necessary for an understanding of embodiments disclosed herein.

The present disclosure relates to corrosion inhibitor compositions and methods for inhibiting corrosion. The inhibitor compositions can effectively reduce, inhibit, and/or prevent corrosion and/or scale in soft or hard water on surfaces, such as those comprising metals. In some aspects, the metals are ferrous metals such as steel, iron, alloys of iron with other metals such as stainless steel; copper; copper alloys; and/or aluminum and its alloys.

A method of inhibiting corrosion of a metal surface in contact with an aqueous medium is provided. The method may include contacting the metal surface with a corrosion inhibitor composition where the corrosion inhibitor composition may include a PSO; an azole; and a molybdate.

A corrosion inhibitor composition is provided. The composition may include a PSO; an azole; and a molybdate.

In some aspects, the PSO may have a structure as depicted in formula I

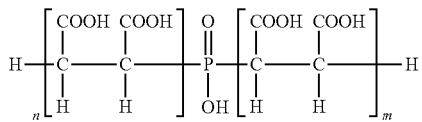

wherein n is an integer from 1 to 5 and m is an integer from 0 to 5. In some aspects, n is 1, 2, 3, 4, or 5. In some aspects, n is an integer from 2 to 5. In some aspects, n is an integer from 3 to 5. In some aspects, n is an integer from 1 to 4. In some aspects, n is an integer from 1 to 3. In some aspects, m is 0, 1, 2, 3, 4, or 5. In some aspects, m is 0. In some aspects, m is 1. In some aspects, m is 2. In some aspects, m is 3. In some aspects, m is 4. In some aspects, m is 5. In some aspects, the PSO may include one or more compounds of formula I. In some aspects, the PSO comprises about 10 to 40 wt % of a compound of formula I where n is 1 and m is 0, about 30 to 60 wt % of a compound of formula I where m is 1 and n is 1, and about 20 to 40 wt % of a compound of formula I where n is 1 and m is 2 to 5. U.S. Pat. No. 6,572,789 describes PSO polymers that can be used in the corrosion inhibitor composition and is incorporated by reference in its entirety.

In some aspects, the PSO is a mixture of compounds of formula 1. For example, the PSO may have molecules having n=1, 2, 3, 4, or 5 in a mixture.

In some aspects, the PSO may be added to the aqueous medium in an amount of about 10 ppm to about 10,000 ppm. In some aspects, the concentration of PSO may be about 50 ppm to about 1,000 ppm. In some aspects, the concentration of PSO is about 100 ppm, about 150 ppm, about 200 ppm, about 250 ppm, or about 300 ppm.

In some aspects, the azole may be TT, BZT, MBT, BBT, or their salts. In some aspects, the azole may be TT.

In some aspects, the azole may be added to the aqueous medium in an amount of about 0.1 ppm to about 1,000 ppm. In some aspects, the concentration of azole may be about 20 ppm to about 500 ppm. In some aspects, the concentration of azole is about 100 ppm, about 150 ppm, about 200 ppm, about 250 ppm, or about 300 ppm.

In some aspects, the molybdate may be sodium molybdate, potassium molybdate, ammonium molybdates, or any other inorganic molybdate salt.

In some aspects, the molybdate may be added to the aqueous medium in an amount of about 0.1 ppm to about 5,000 ppm. In some aspects, the concentration of molybdate is about 20 ppm to about 500 ppm. In some aspects, the concentration of molybdate is about 50 ppm In some aspects, the ratio of PSO to molybdate is about 2 to 1 and the ratio of PSO to azole is about 2 to 1.

In some aspects, the corrosion inhibitor composition may include a scale inhibitor. The scale inhibitor may be a polymer. Examples of scale inhibitors include, but are not limited to, a polyacrylate (PAA), a polymaleic anhydride (PMA), an alkyl epoxy carboxylate (AEC), a polyacrylamide copolymer (AA/AM), an acrylic acid and hydroxypropylacrylate copolymer (AA/HPA), an acrylic acid and 2-acrylamido-2-methyl propane sulfonate copolymer (AA/AMPS), a maleic anhydride and sulfonated styrene copolymer (MA/SS), an acrylic acid/acrylamide/tertiary butyl acrylamide copolymer (AA/AM/t-BAM), an acrylic acid/2-acrylamido-2-methyl propane sulfonate/tertiary butyl acrylamide (AA/AMPS/t-BAM), an acrylic acid/sulfonated styrene/2-acrylamido-2-methyl propane sulfonate (AA/SS/AMPS), an acrylic acid/acrylamide/aminomethyl sulfonate copolymer (AA/AM/AMS), and any combination thereof.

In some aspects, the scale inhibitor comprises a copolymer of acrylic acid and t-BAM in a 60:40 mole ratio, respectively.

In some aspects, the polymer may include about 80 to about 99 mole percent acrylic acid and from about 1 to about 20 mole percent AMPS. In some aspects, the copolymer may comprise about 95% acrylic acid and about 4% AMPS or about 90% acrylic acid and about 10% AMPS. In other aspects, the polymer may be a tetrapolymer comprising acrylic acid, itaconic acid, AMPS, and tertiary butyl acrylamide in any mole percent. Other polymers that may be used in the inhibitor compositions include, but are not limited to, copolymers of acrylic acid and AMPS comprising about 40 to about 70% acrylic acid and about 30 to about 60% AMPS. In other aspects, the polymer may be a copolymer comprising about 60% acrylic acid and about 40% AMPS or about 50% acrylic acid and about 50% AMPS.

In some embodiments, the polymer may have a weight average molecular weight of about 5,000 Da to about 50,000 Da. In some embodiments, the polymer may have a weight average molecular weight of about 20,000 Da.

In some aspects, the scale inhibitor may include about 52 wt % water; about 47 wt % copolymer of acrylic acid and acrylamido tertiary-butyl sulfonic acid (ATBS); 0.23 wt % sodium sulfate; 0.01 wt % sodium bisulfite; and a trace amount of pyrenetetrasulfonic acid tetrasodium salt.

In certain aspects, the composition comprises an effective amount of the scale inhibitor, which may be appropriately selected by one of skill in the art. The amount of scale inhibitor added to the aqueous medium may range from about 0.1 ppm to about 100 ppm. In some aspects, the amount of scale inhibitor may range from about 1 ppm to about 50 ppm, about 0.5 ppm to about 20 ppm, about 1 ppm to about 10 ppm, or about 1 ppm to about 20 ppm. In other aspects, the amount of scale inhibitor may range from about 5 ppm to about 30 ppm, about 10 ppm to about 20 ppm, or about 5 ppm to about 20 ppm. In some aspects, the amount of scale inhibitor added to the aqueous system may be about 5 ppm, about 6 ppm, about 7 ppm, about 8 ppm, about 9 ppm, about 10 ppm, about 11 ppm, about 12 ppm, about 13 ppm, about 14 ppm, or about 15 ppm.

In some aspects, the corrosion inhibitor composition may include a buffering agent or pH modifier. Examples of buffering agents or pH modifiers include, but are not limited to, a primary, secondary or tertiary amine, or an alkali metal hydroxide. Examples of primary, secondary or tertiary amine compounds include, but are not limited to, triethanolamine (TEA), morpholine, or ethanolamine. Examples of alkali metal hydroxides include, but are not limited to, sodium hydroxide, potassium hydroxide, or combinations of the same.

The amount of the buffering agent or pH modifier added to the aqueous medium may be about 0.1 to about 50,000 ppm.

In some aspects, the scale inhibitor may be an acrylic acid and 2-acrylamido-2-methyl propane sulfonate copolymer; the buffering agent may be TEA; the azole may be tolytriazole; and the molybdate may be sodium molybdate dihydrate.

In some aspects, the corrosion inhibitor composition may include a solvent. Examples of solvents include, but are not limited to, water, acetone, methanol, ethanol, propanol, formic acid, formamide, propylene glycol, ethylene glycol, or any combination thereof. In some aspects, the corrosion inhibitor composition may include water.

In some aspects, the corrosion inhibitor composition may consist of water; the PSO; the azole; and the molybdate. In some aspects, the corrosion inhibitor composition may consist of water; the PSO; the scale inhibitor; the azole; and the molybdate. In some aspects, the corrosion inhibitor composition may consist of water; the PSO; the scale inhibitor; the azole; the buffering agent or pH modifier; and the molybdate.

In some aspects, the method may include adding the corrosion inhibitor composition to the aqueous medium at a dosage amount of about 0.1% by volume to about 2% by volume. In some aspects, the dosage amount is about 0.2%, about 0.3%, about 0.4%, about 0.5%, about 0.6%, about 0.7%, about 0.8%, about 0.9%, or about 1.0% by volume.

In some aspects, the corrosion inhibitor composition does not include tin. In some aspects, the corrosion inhibitor composition does not include zinc.

In some aspects, the tin or zinc is not added to the aqueous medium.

The aqueous medium to which the corrosion inhibitor composition is added may have certain properties that are specific for the specific process. For example, a boiler may have a recommended pH operating range or solute concentration. In some aspects, the aqueous medium may have a pH of from about 6 to about 9. In some aspects, the aqueous medium may have a pH of about 6.5, about 7, about 7.5, about 8, or about 8.5. In general, about 7.5 to about 8.5 is the recommended pH range for boilers having significant aluminum content. In some aspects, the aqueous medium has a chloride concentration of less than about 150 ppm. The conductivity of the aqueous medium may range from about zero µS/cm to thousands or tens of thousands µS/cm. The conductivity may be above about 500 µS/cm, above about 1,000 µS/cm, or above about 5,000 µS/cm.

A number of different metal surfaces may be in contact with the aqueous medium to with the corrosion inhibitor is added. For example, the different metal surfaces may comprise different metals or metal alloys such as mild steel, aluminum, or copper. In some aspects, the metal surface comprises a first metal surface comprising aluminum, a second metal surface comprising mild steel, a third metal surface comprising copper, or any combination thereof. In some aspects, the metal surface may include iron, copper, an iron alloy, a copper alloy, admiralty brass, about 90% copper and about 10% nickel, about 80% copper and about 20% nickel, about 70% copper and about 30% nickel, aluminium brass, manganese brass, leaded naval bronze, phosphor bronze, or any combination thereof. In some aspects, the metal surface may be at least part of an aluminum boiler. In some aspects, the corrosion inhibitor composition is added into an aluminum boiler. In some aspects, the corrosion inhibitor composition is added into a heat exchanger.

In some aspects, the metal surface may be an aluminum alloy. Examples of aluminum alloys include, but are not limited to, Al360, Al4032, Al6061, Al7075, AlSi10Mg, AlSi12, H9-6060, a 1000 series alloy, a 2000 series alloy, a 4000 series alloy, a 5000 series alloy, a 6000 series alloy, a 7000 series alloy, a cast 1xx series alloy, a cast 2xx series alloy, a cast 3xx series alloy, a cast 4xx series alloy, a cast 5xx series alloy, a cast 6xx series alloy, a cast 7xx series alloy, or a cast 8xx series alloy.

The corrosion inhibitor composition may lower the corrosion rate of the metal surface. In some aspects, a corrosion rate of the metal surface may be less than about 1 mpy. In some aspects, a corrosion rate of the metal surface may be less than about 0.5 mpy.

In some aspects, corrosion inhibitor composition may lower pitting corrosion, crevice corrosion, exfoliation, and intergranular corrosion of aluminum alloys. As used herein "pitting corrosion" refers to localized accelerated dissolution of metals that occurs as a result of breakdown of the otherwise protective passive film on the metal/alloy surface. In general, pitting corrosion involves there stages: pitting initiation, metastable pitting, and pitting growth.

In some aspects, the corrosion inhibitor composition may include an additional additive. Examples of additives include, but are not limited to, an additional corrosion inhibitor, a treatment polymer, an anti-microbial agent, a colorant, a filler, a surfactant, a viscosity modifier, a chelating agent, a dispersant, a deodorant, a masking agent, an oxygen scavenger, or an indicator dye.

In some embodiments, the corrosion inhibitor composition may include an inert tracer, making it compatible with fluorescent tracing technology such as TRASAR® technology (available from Nalco® Company, Naperville, Ill., USA). In other aspects, an inert fluorescent tracer may be included in the composition to provide a means of determining the dosage level. A known proportion of the fluorescent tracer may be added either simultaneously or sequentially with the dispersants or anti-foaming agents. Effective inert fluorescent tracers may include those substances that are chemically non-reactive with other components in the system and that do not significantly degrade with time.

Representative inert fluorescent tracers include fluorescein or fluorescein derivatives; rhodamine or rhodamine derivatives; naphthalene sulfonic acids (mono-, di-, tri-, etc.); pyrene sulfonic acids (mono-, di-, tri-, tetra-, etc.); stilbene derivatives containing sulfonic acids (including optical brighteners); biphenyl sulfonic acids; phenylalanine; tryptophan; tyrosine; vitamin B2 (riboflavin); vitamin B6 (pyridoxin); vitamin E (a-tocopherols); ethoxyquin; caffeine; vanillin; naphthalene sulfonic acid formaldehyde condensation polymers; phenyl sulfonic acid formaldehyde condensates; lignin sulfonic acids; polycyclic aromatic hydrocarbons; aromatic (poly)cyclic hydrocarbons containing amine, phenol, sulfonic acid, carboxylic acid functionalities in any combination; (poly)heterocyclic aromatic hydrocarbons having N, O, or S; a polymer containing at least one of the following moieties: naphthalene sulfonic acids, pyrene sulfonic acids, biphenyl sulfonic acids, or stilbene sulfonic acids.

In some aspects, the additional corrosion inhibitor may be zinc, aluminum, manganese, nickel, silicate, molybdate, strontium, titanium, chromate, cobalt, cerium, any salt thereof, any oxide thereof, or any combination thereof. In some embodiments, the additional corrosion inhibitor may include zinc or any oxide thereof. The additional corrosion inhibitors may be in the form of any salt or any oxide. Illustrative, non-limiting examples of inorganic salts may be chloride, nitrate, nitrite, or sulfate. The salt form may be organic including, but not limited to, acetate or citrate salts.

Each component of the corrosion inhibitor composition may be added separately or as a mixture, and the addition may be manual addition or automatic addition using chemical injection pumps and the automated system described herein. The compositions (or components thereof) may be dosed periodically or continuously into the aqueous system.

In some embodiments, the aqueous medium includes an oxidizing halogen compound such as, for example, bleach. Examples of oxidizing halogen compounds include, but are not limited to, hypochlorite bleach, chlorine, bromine, hypochlorite, hypobromite, chlorine dioxide, iodine/hypoiodous acid, hypobromous acid, a halogenated hydantoin, a peroxide, a persulfate, a permanganate, a peracetic acid or any combination thereof.

In some aspects, the aqueous medium may include a non-halogen-containing oxidizing biocide. Examples of non-halogen-containing oxidizing biocides include, but are not limited to, 5-chloro-2-methyl-4-isothiazolin-3-one, 2-methyl-4-isothiazolin-3-one, glutaraldehyde, dibromo propionic acid, quaternary ammonium salts or any combination thereof.

The aqueous medium may be a part of an industrial water system. "Industrial water system" means any system that circulates water as its primary ingredient. Non-limiting examples of "industrial water systems" include cooling systems, boiler systems, heating systems, membrane systems, papermaking systems, or any other systems that circulate water. Bleach may be added to any of these industrial water systems to control microbial growth. An advantage of the compounds of formula (I) is that they are stable in the presence of biocides.

The presently disclosed inhibitor compositions may be used in any aqueous system comprising surfaces susceptible of corrosion. For example, the inhibitor compositions may be used in once-through, open loop, or closed loop recirculating cooling water systems. Other aqueous systems include, but are not limited to, systems used in petroleum production and oil recovery (e.g., well casing transport pipelines, etc.) and refining, geothermal wells, and other oil field applications; boilers and boiler water systems; systems used in power generation, mineral process waters including mineral washing, flotation and benefaction; paper mill digesters, washers, bleach plants, white water systems and mill water systems; black liquor evaporators in the pulp industry; gas scrubbers and air washers; continuous casting processes in the metallurgical industry; air conditioning and refrigeration systems; building fire protection heating water, such as pasteurization water; water reclamation and purification systems; membrane filtration water systems; food processing streams and waste treatment systems as well as in clarifiers, liquid-solid applications, municipal sewage treatment systems; and industrial or municipal water distribution systems.

In some aspects, the aqueous system may be a cooling system, a boiler system, a heating system, a membrane system, a paper making system, a food and beverage system, an oil and gas system, or any system that comprises water.

In particular aspects of the present disclosure, the inhibitor compositions may be used in connection with warewashing compositions. Warewashing compositions may be used for protecting articles, such as glassware or silverware, from corrosion in a dishwashing or warewashing machine. However, it is to be understood that the warewashing compositions comprising the presently disclosed inhibitor compositions can be available for cleaning environments other than inside a dishwashing or warewashing machine.

In certain aspects, the disclosed inhibitor compositions may have one or more of the following characteristics:
  Halogen stability up to about 0.5 ppm free residual chlorine (FRC);
  Ability to handle water temperatures up to about 60° C.;
  Compatibility with azoles, dispersants, and cooling water polymers;
  Calcium tolerance up to about 500 ppm as $CaCO_3$;
  Chloride tolerance up to about 600 ppm as Cl;
  Stability over a pH from about 6 to about 9;
  Low toxicity (e.g. $LC_{50}$>100 mg/L); and
  Stable for a Holding Time Index (HTI) of from a few seconds up to about 5 years.

Any of the presently disclosed aqueous systems may be automatically monitored and controlled. For example, the pH of the systems may be monitored and controlled or the amount of inhibitor composition in the aqueous system may be monitored and controlled.

The present disclosure also describes an on-line unit and system for measuring, controlling, and/or optimizing one or more system parameters or properties of water. Optimization can include, for example, measuring one or more properties associated with the water to be sure that the one or more properties are within an acceptable, predetermined range and, if the one or more properties are not within the acceptable, predetermined range for each respective property being measured, causing a change in the water to bring the property back within the acceptable, predetermined range.

In certain embodiments, the system includes a monitoring and controlling unit that comprises a controller and a plurality of sensors. Each of the plurality of sensors can be in communication with the controller. For example, if the unit comprises five sensors, each of the five sensors can be in communication with the controller. In certain aspects, the controller can be attached to a skid, or other type of support member, to allow for mobility.

As used herein, the term "controller" refers to a manual operator or an electronic device having components, such as a processor, memory device, digital storage medium, a communication interface including communication circuitry operable to support communications across any number of communication protocols and/or networks, a user interface (e.g., a graphical user interface that may include cathode ray tube, liquid crystal display, plasma display, touch screen, or other monitor), and/or other components.

The controller is preferably operable for integration with one or more application-specific integrated circuits, programs, computer-executable instructions or algorithms, one or more hard-wired devices, wireless devices, and/or one or more mechanical devices. Moreover, the controller is operable to integrate the feedback, feed-forward, and/or predictive loop(s) of the invention. Some or all of the controller system functions may be at a central location, such as a network server, for communication over a local area network, wide area network, wireless network, internet connection, microwave link, infrared link, wired network (e.g., Ethernet) and the like. In addition, other components, such as a signal conditioner or system monitor, may be included to facilitate signal transmission and signal-processing algorithms.

In certain aspects, the controller includes hierarchy logic to prioritize any measured or predicted properties associated with system parameters. For example, the controller may be programmed to prioritize system pH over conductivity, or vice versa. It should be appreciated that the object of such hierarchy logic is to allow improved control over the system parameters and to avoid circular control loops.

In some embodiments, the monitoring and controlling unit and method associated therewith includes an automated controller. In some embodiments, the controller is manual or semi-manual. For example, when the system includes one or more datasets received from various sensors in the system, the controller may either automatically determine which data points/datasets to further process or an operator may partially or fully make such a determination. A dataset for an industrial body of water, for instance, may include variables or system parameters such as oxidation/reduction potential (ORP), dissolved oxygen (DO), conductivity, pH, turbidity, concentrations of certain chemicals, such as biocides, scale inhibitors, friction reducers, acids, bases, and/or oxygen scavengers, levels of ions (e.g., determined empirically, automatically, fluorescently, electrochemically, colorimetrically, measured directly, calculated), temperature, pressure, flow rate, total dissolved or suspended solids, etc. Such system parameters are typically measured with any type of suitable data capturing equipment, such as sensors designed specifically for these parameters, e.g., pH sensors, ion analyzers, temperature sensors, thermocouples, pressure sensors, corrosion probes, and/or any other suitable device or sensor. Data capturing equipment is in communication with the controller and, according to some embodiments, may have advanced functions (including any part of the control algorithms described herein) imparted by the controller.

The monitoring and controlling unit may comprise a plurality of sensors, which are capable of analyzing the water and transmitting data regarding the water to the controller. The plurality of sensors can comprise, for example, sensors for measuring conductivity, pH, ORP, biocide concentration, turbidity, temperature, flow, and DO in the water. The monitoring and controlling unit may comprise any of these sensors, all of these sensors, a combination of two or more of these sensors, one or more additional sensors not specifically mentioned here, and the sensors may be in communication with the controller. Other types of sensors contemplated by the present disclosure include, but are not limited to, oil in water sensors, total dissolved solids sensors, and total suspended solids sensors.

The presently disclosed monitoring and controlling system comprises, in certain embodiments, one or more chemical injection pumps. Each chemical injection pump may be in fluid communication with a storage device. Each storage device may comprise one or more chemicals and the chemical injection pumps may transport those chemicals into the body of water. In some embodiments, the chemical injection pump comprises the storage device. The chemical injection pumps may be in communication with the controller in any number of ways, such as through any combination of wired connection, a wireless connection, electronically, cellularly, through infrared, satellite, or according to any other types of communication networks, topologies, protocols, standards and more. Accordingly, the controller can send signals to the pumps to control their chemical feed rates.

In certain embodiments, the monitoring and controlling system is implemented to have the plurality of sensors provide continuous or intermittent feedback, feed-forward, and/or predictive information to the controller, which can relay this information to a relay device, such as the Nalco Global Gateway, which can transmit the information via cellular communications to a remote device, such as a cellular telephone, computer, and/or any other device that can receive cellular communications. This remote device can interpret the information and automatically send a signal (e.g. electronic instructions) back, through the relay device, to the controller to cause the controller to make certain adjustments to the output of the pumps. The information can also be processed internally by the controller and the controller can automatically send signals to the pumps to adjust the amount of chemical injection, for example. Based upon the information received by the controller from the plurality of sensors or from the remote device, the controller may transmit signals to the various pumps to make automatic, real-time adjustments, to the amount of chemical that the pumps are injecting into the water.

Alternatively, an operator of the remote device that receives cellular communications from the controller can manually manipulate the pumps through the remote device. The operator may communicate instructions, through the remote device, cellularly or otherwise, to the controller and the controller can make adjustments to the rate of chemical addition of the chemical injection pumps. For example, the operator can receive a signal or alarm from the remote device through a cellular communication from the controller and send instructions or a signal back to the controller using the remote device to turn on one or more of the chemical injection pumps, turn off one or more of the chemical injection pumps, increase or decrease the amount of chemical being added to the water by one or more of the injection pumps, or any combination of the foregoing. The controller and/or the remote device is also capable of making any of the foregoing adjustments or modifications automatically without the operator actually sending or inputting any instructions. Preset parameters or programs are entered into the controller or remote device so that the controller or remote device can determine if a measured property is outside of an acceptable range. Based on the information received by the plurality of sensors, the controller or remote device can make appropriate adjustments to the pumps or send out an appropriate alert.

EXAMPLES

Dynamic Loop Test Procedure:

Corrosion rates were measured in a closed loop system with various synthetic water matrix comprising hardness of about 0-800 ppm as $CaCO_3$, chloride 0-600 ppm, and sulfate: 0-250 ppm, pH 6-10, conductivity 0-2000 μS, and the M-Alk was about 0-1000 ppm. In the event of evaporation, DI water was added. For the tests described below, the water had the following properties and contents: The pH of the water was about 7.3, the conductivity was about 340 μS, the M-Alk was about 120 ppm, chloride ions 15 ppm, sulfate 25 ppm, hardness about 50 ppm. $CaCl_2$ is added to adjust the hardness and NaCl is added to adjust chloride ion level. In the event of evaporation, DI water was added.

The testing period was from 1-180 days. The temperature of the water was about 60° C. to about 80° C.

The metal coupons tested were Al1100 or Al360, mild steel, copper, and brass. Al360 is most similar to the chemical composition to the cast Al used for Al boilers. Other aluminum alloys such as Al7075, Al6061, Al5083 were also tested for confirmation of the universal effectiveness of the formula on aluminum alloys.

A specific type of water was added to the loop. A specific water treatment at specific dosage was added to the water. Clean and polished metal coupons were installed in the sample holder in the loop. Water flow through the loop was started and the temperature controlled. The temperature and water level were maintained constant. The water flow was turned off after target testing time. The metal coupons were removed and inspected. The corrosion rate was measured.

Stagnant/Jar Test Procedure:

Coupons were immersed in water and formula at certain dosage in jars. A specific type of water was added to the container/jar. A specific water treatment at specific dosage was added to the water. Clean and polished metal coupons were immersed in the jar, and the jar was placed in a water bath set at certain temperature. The temperature and water level were maintained constant. At the end of the testing period, the metal coupons were removed and inspected. The corrosion rate was measured.

TABLE 1

| Formula I composition | | | |
|---|---|---|---|
| Description (components/or chemicals) | Percentage | 0.3% Dosage, active, ppm | 0.7% Dosage, active, ppm |
| DI Water | 29.857% | — | — |
| PSO | 25.000% | 275 | 642 |
| Copolymer of Acrylic acid:AMPS with 60:40 ratio, 44% | 0.619% | 9 | 21 |
| Triethanolamine | 23.810% | 750 | 1,750 |
| Tolytriazole, sodium salts, 50% solution | 10.000% | 135 | 315 |
| Sodium Molybdate Dihydrate | 10.714% | 225 | 525 |

Figure 1B:
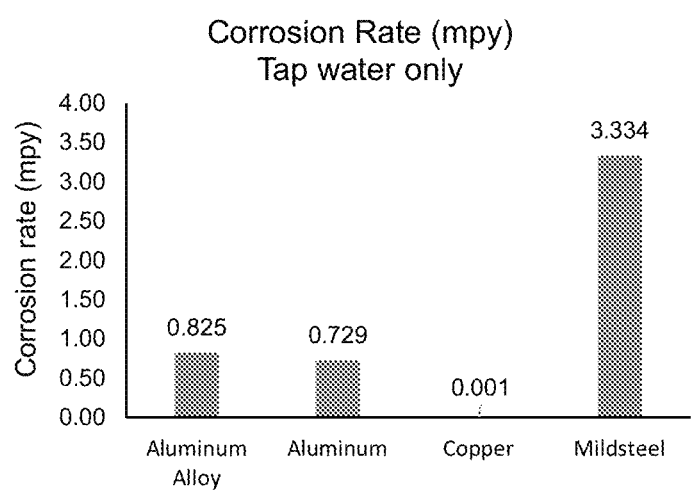

FIGS. 1A and 1B show the lab corrosion testing results of the metals in tap water treated with the formula (0.4% dosage) and without the formula (control). FIG. 1A shows the coupons placed in the loop exposed to water treated with example formula, and FIG. 1B shows the coupon exposed to water without treatment. Much more severe corrosion was observed on mild steel and aluminum coupons in water without the formula dosed. The corrosion rates of the metals were measured and shown in FIGS. 1A and 1B. The corrosion rates of the metals were far lower than the goal and industrial corrosion protection standard, which is aluminum<0.5 mpy, mild steel<1.0 mpy, and copper<0.2 mpy.

The example formula was also tested in water containing higher amount of chloride ions. Similar results were obtained. Example formula greatly reduced the corrosion of differential metals.

Figure 2:
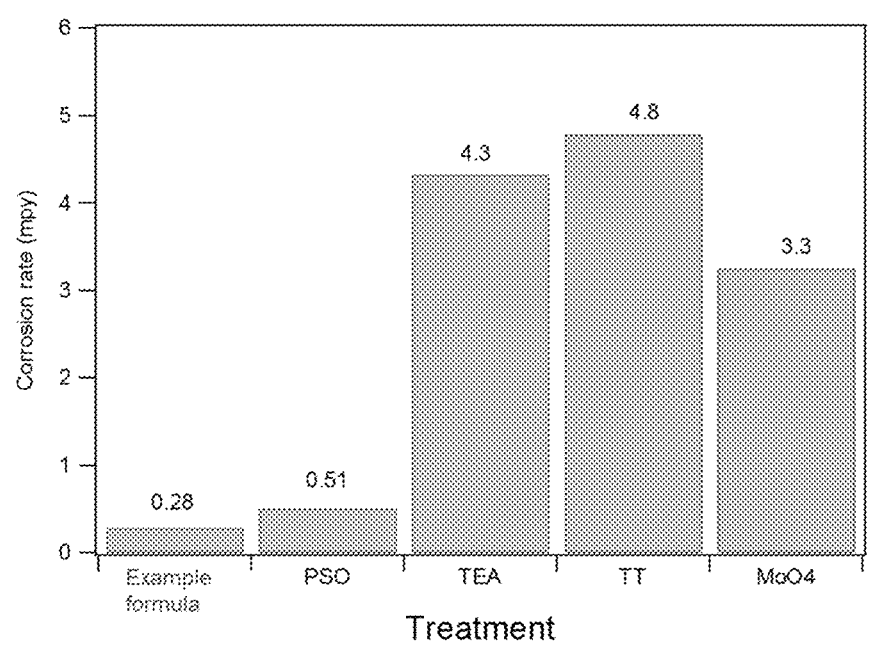
FIG. 2 shows the corrosion rate of aluminum alloy 360 (Al360) in the water dosed with the example formula, PSO, TEA, TT, and molybdate, respectively, measured by electrochemical method.

The example formula is found to have better corrosion protection than the individual components in the formula. The example formula contains PSO, TEA, TT and $MoO_4$. Electrochemical method was used to measure the corrosion rate of aluminum alloy 360 (Al360) in the water dosed with the example formula, PSO, TEA, TT and molybdate, respectively. The corrosion rate of Al360 in the formula is lower than individual components (FIG. 2).

The inspection of the metal coupons after the electrochemical test confirm the corrosion protection by the example formula. The coupons treated with the example formula were shining with minimal corrosion. The coupon in the PSO only had very light rust on the surface. The coupons in TEA, TT, molybdate and tap water control showed darkening of the surface and corrosion.

Figure 3:
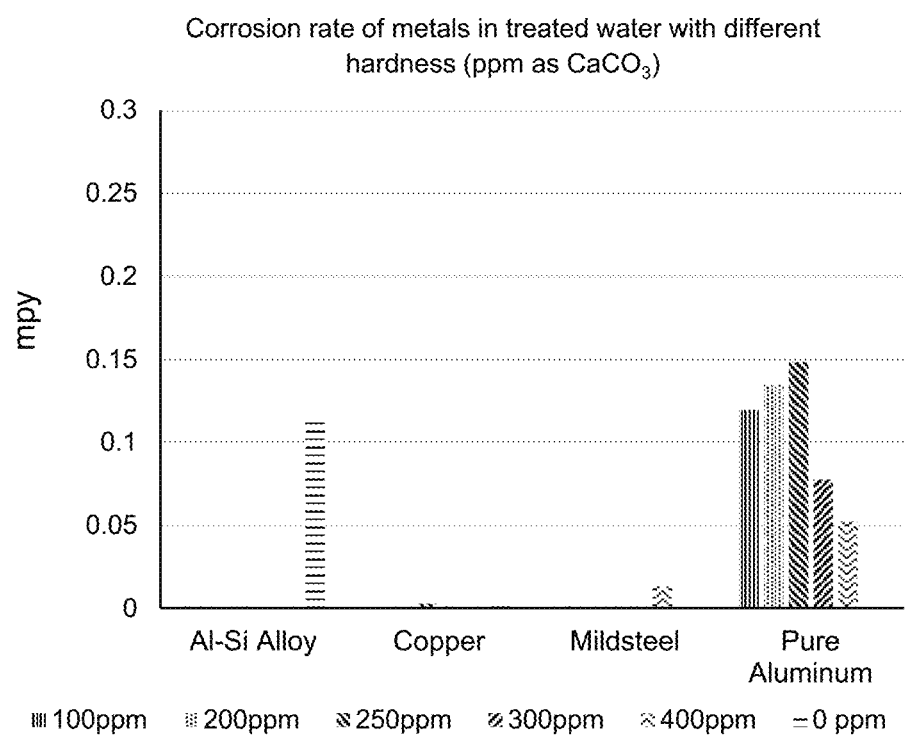
FIG. 3 shows corrosion rates using formula I in water with different hardness (0-400 ppm as CaCO$_3$). Metal tested include Al—Si alloy, pure aluminum, steel, copper.

Corrosion inhibition was measured at different hardness levels ranging from 0 to 400 ppm of $CaCO_3$. The Formula I composition was used with four different metals. Formula I showed good protection of different metals including Al—Si alloy, pure aluminum, steel and copper in water with different hardness. At different hardness levels, formula I was able to control the corrosion of all metals well below 0.2 mpy. FIG. 3 shows corrosion rates using formula I in water with different hardness (0-400 ppm as $CaCO_3$).

Corrosion of metals increases with stress in water such as chloride ion concentration and residual chlorine level. Formula I was found to work in water containing chloride ions and residual chlorine level. Formula I was tested in high chloride condition (150-200 ppm). In experiments the formula demonstrated good corrosion control up to 400 ppm Cl—. Only spotted light corrosion showed up on aluminum coupons. (Metal coupons not shown). Aluminum 360 alloy, steel, pure aluminum, copper and copper alloy were tested. Medium to severe corrosion showed up on untreated aluminum and steel coupons.

Figure 4:
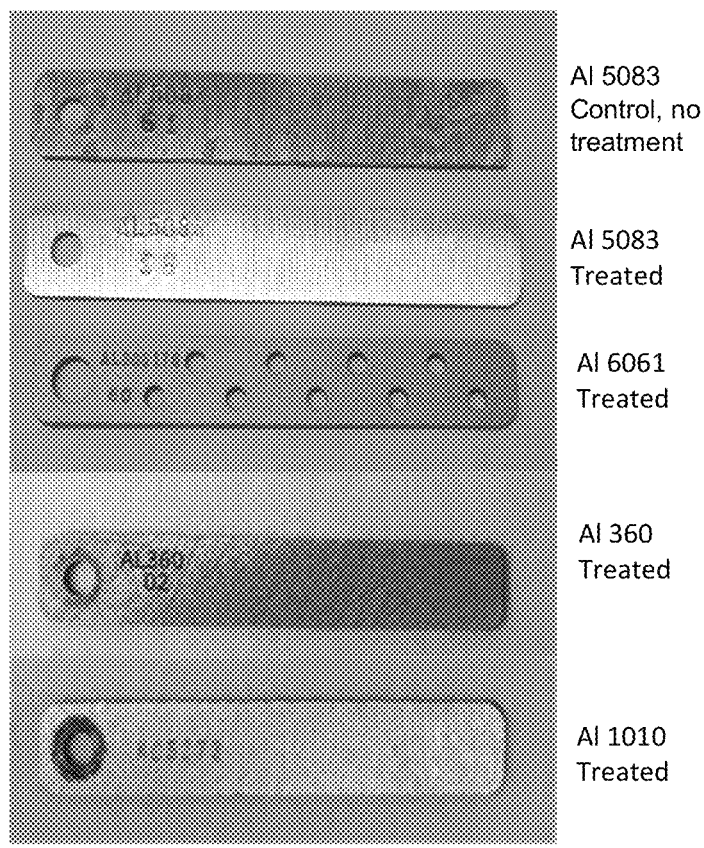
FIG. 4 shows different aluminum alloys treated with formula I compared to a control.

Formula I is particularly effective for all aluminum alloys. For example; Al 1000 series, Al2000 series, Al 4000 series, Al 5000 series, Al6000 series, Al 7000 series. Cast alloy: Al—Si, Al—Si—Mg. FIG. 4 shows some of the corrosion test results of the formula on different Aluminum alloys. Formula I showed good protection from general corrosion and localized corrosion on various aluminum alloys.

Localized corrosion is particularly a threat for aluminum alloys. Formula I was able to protect aluminum from pitting and localized corrosion.

Any composition disclosed herein may comprise, consist of, or consist essentially of any of the compounds/components disclosed herein. In accordance with the present disclosure, the phrases "consist essentially of," "consists essentially of," "consisting essentially of," and the like limit the scope of a claim to the specified materials or steps and those materials or steps that do not materially affect the basic and novel characteristic(s) of the claimed invention.

As used herein, the term "about" refers to the cited value being within the errors arising from the standard deviation found in their respective testing measurements, and if those errors cannot be determined, then "about" refers to within 5% of the cited value.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a polymer" is intended to include "at least one polymer" or "one or more polymers."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method of inhibiting corrosion of a metal surface in contact with an aqueous medium, comprising:
    contacting the metal surface with a corrosion inhibitor composition, the corrosion inhibitor composition consisting of:
    water;
    a copolymer of acrylic acid and 2-acrylamido-2-methyl propane sulfonate;
    a phosphino succinic oligomer (PSO) consisting of a first, a second, and a third compound of formula I:

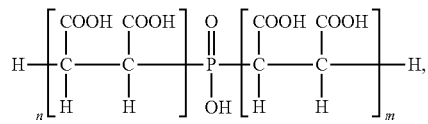

wherein n is 1 and m is 2 to 5 in the first compound; n is 1 and m is 0 in the second compound; m is 1 and n is 1 in the third compound;
    an azole that is tolytriazole (TT);
    a molybdate; and
    a buffering agent that is triethanolamine,
    wherein the metal surface comprises aluminum,
    wherein a ratio of the PSO to the azole in the corrosion inhibitor composition is about 2 to 1, and a ratio of the PSO to the molybdate in the corrosion inhibitor composition is about 2 to 1;
    wherein the aqueous medium has a pH of from about 6 to about 8, and
    wherein the corrosion inhibitor composition is added to the aqueous medium at a dosage rate from about 0.1% by volume to about 2% by volume.

2. The method of claim 1, wherein the aqueous medium has a pH of from about 7 to about 8.

3. The method of claim 1, wherein the aqueous medium has a chloride concentration of less than about 150 ppm.

4. The method of claim 1, wherein the aqueous medium comprises about 10 ppm to about 10000 ppm of the PSO; about 2 ppm to about 50 ppm of the copolymer of acrylic acid and 2-acrylamido-2-methyl propane sulfonate; about 0.1 ppm to about 1000 ppm of the azole; about 0.1 to about 50000 ppm of the buffering agent; and about 0.1 ppm to about 5000 ppm of the molybdate.

5. The method of claim 1, wherein the metal surface is at least part of an aluminum boiler.

6. The method of claim 1, wherein a corrosion rate of the metal surface is less than about 1 mpy.

7. The method of claim 1, wherein a corrosion rate of the metal surface is less than about 0.5 mpy.

8. The method of claim 1, wherein the corrosion inhibitor composition does not include tin.

9. The method of claim 1, wherein the corrosion inhibitor composition is added to the aqueous medium at a dosage rate from about 0.3% by volume to about 0.7% by volume.

10. The method of claim 1, wherein the copolymer of acrylic acid and 2-acrylamido-2-methyl propane sulfonate has a molecular weight average of about 5,000 Da to about 50,000 Da.

11. The method of claim 1, wherein the metal surface further comprises a second metal surface comprising mild steel, a third metal surface comprising copper, or a combination thereof.

12. The method of claim 1, wherein the molybdate is sodium molybdate.

13. The method of claim 1, wherein the PSO consists of about 20 to about 40 wt. % of the first compound, about 10 to about 40 wt. % of the second compound, and about 30 to about 60 wt. % of the third compound.

* * * * *